United States Patent Office 3,226,442
Patented Dec. 28, 1965

3,226,442
PREPARATION OF PRIMARY AMINES FROM
1-NITRO-OLEFINS
Giovanni A. Bonetti, Wilmington, Del., Chester B. De
Savigny, Rancho Cordova, Calif., and Conrad Michalski, Media, Pa., assignors to The Atlantic Refining Company, Philadelphia, Pa., a corporation of Pennsylvania
No Drawing. Filed Sept. 19, 1962, Ser. No. 224,837
10 Claims. (Cl. 260—583)

This invention relates to the preparation of saturated aliphatic primary amines and more particularly to the preparation of saturated aliphatic primary amines by a direct catalytic hydrogenation of 1-nitro-olefins.

The hydrogenation of nitro-olefins having a nitro group attached to one of the carbon atoms carrying the double bond has been widely investigated in the prior art. It was found that catalytic as well as chemical hydrogenations produced a variety of products including oximes, ketones, aldehydes, imines, polymeric compounds and other materials. Substantial yields of saturated amines were obtained only when the aliphatic nitro-olefins were attached directly to a benzene ring; for example, as in omega-nitro-styrene. Aliphatic 1-nitro-olefins have, to date, resisted any attempts to be directly hydrogenated to the corresponding saturated amines in any appreciable yields.

A method has now been found whereby a 1-nitro-olefin having the following general formula

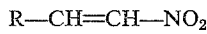

$$R\text{---}CH\text{=}CH\text{---}NO_2$$

wherein R is an alkyl radical having from 1 to 24 carbon atoms may be directly hydrogenated to produce the corresponding saturated aliphatic primary amine.

It is, therefore, an object of this invention to provide a method for preparing saturated aliphatic primary amines.

It is another object of this invention to provide a method for preparing saturated aliphatic primary amines in good yields.

It is another object of this invention to provide a method for preparing saturated aliphatic primary amines by a direct catalytic hydrogenation of a 1-nitro-olefin.

Other objects will become apparent from the following description and appended claims.

Briefly stated, this invention comprises a method for preparing saturated aliphatic primary amines by a direct catalytic hydrogenation of a 1-nitro-olefin, wherein the hydrogenation is conducted in the presence of a solvent containing added water.

As stated above, the 1-nitro-olefins which may be hydrogenated to the corresponding saturated aliphatic primary-amines according to the process of this invention have the general formula R—CH=CH—NO$_2$, wherein R is an alkyl radical containing from 1 to 24 carbon atoms, preferably from 3 to 16 carbon atoms. 1-nitroolefins of this type are well known and may be prepared by a number of methods. For example, they may be prepared by condensing an aldehyde with nitro-methane in the presence of triethyl amine. The reaction product is substantially converted to the corresponding acetate with acetic anhydride and after refluxing in the presence of sodium carbonate and benzene for about 20 hours, the product resulting from a distillation will be the desired 1-nitro-olefin. This method is set forth in detail in "Mémoires Présentés a la Société Chimique," H. Cerf de Mauny, pages 133 to 139 (1940). Other well-known methods for the preparation of 1-nitro-olefins may be found in the following references:

Ber. 52, 389 (1919), 55, 316 (1922).
Bull. (5), 4, 1451 (1937).
Bull (3), 29,644.
Drake, N. L., et al., J. Org. Chem., 12,704 (1947).

The conditons of temperature and pressure and the catalyst to be used in the hydrogenation of the 1-nitroolefins to produce the saturated aliphatic primary amines are those which are well known in the prior art. For example, temperatures of from about 20° C. to about 100° C. or slightly higher may be employed. The pressure used is in the range of from about 25 p.s.i.g. to about 80 p.s.i.g. of hydrogen although pressures above or below this range may be utilized. Optimum temperatures and pressures may be obtained experimentally for each specific 1-nitro-olefin to be hydrogenated. In general, the hydrogenation reactions will proceed at a satisfactory rate at temperatures within the range of about 20° C. to about 60° C.

Any of the standard hydrogenation catalysts may be used in the hydrogenation of the 1-nitro-olefins to form the corresponding primary amines. The preferred catalysts employed in this invention comprise palladium on charcoal and palladium-ruthenium on charcoal. Other catalysts which may be used comprise nickel and metals of the platinum group of the periodic table either unsupported or supported on a carrier. The supported catalyst may be in the form of pellets, granules or powder. Examples of hydrogenation catalysts which have particular utility in the instant invention and a method for the preparation of such catalysts may be found in the following references:

Nickel on Kieselguhr, Covert and Conner, J. Am. Chem. Soc., 54, 165 (1932).

Platinum or Palladium on Alumina, Schwarcman, U.S. Patent No. 1,111,502.

Platinum Black, Sabatier-Reid, Catalysis in Organic Chemistry, D. Van Nostrand Co., New York (1922).

Palladium on Charcoal, Mannich & Thiele, Ber. Deutches Pharm. Ges., 26, 36–48 (1916).

Platinum on Charcoal, Ellis, U.S. Patent No. 1,174,245.

Raney Nickel, Covert, J. Am. Chem. Soc., 54, 4116 (1952).

It has been found that in order to directly catalytically hydrogenate a 1-nitro-olefin to the corresponding saturated aliphatic primary amine in appreciable yields, the hydrogenation must be conducted in the presence of a solvent containing added water. Useful solvent mixtures include ethanol-water, dioxane-water, and tetrahydrofuran-water. It has further been found that if no water is added to the hydrogenation system, the yield of desired primary amine will be exceedingly small and in fact may be negligible.

The maximum amount of water which may be used in the solvent-water mixture is limited only by the solubility in such mixture of the 1-nitro-olefin being hydrogenated. The 1-nitro-olefin must be soluble in the solvent-water mixture. If the 1-nitro-olefin is not soluble in the solvent-water mixture, a heterogeneous hydrogenation system is produced and the hydrogenation products will include oximes, ketones, aldehydes, imines, polymeric compounds, and other materials with little or no production of the desired saturated aliphatic primary amine. It has been found, in general, that an amount of water ranging between about 5 to about 50 volume percent of the solvent-water mixture will be satisfactory. It is preferred in the practice of this invention to use an amount of water ranging between about 10 to about 30 volume percent of the solvent-water mixture.

The solvent used in the solvent-water mixture may be any solvent used in a conventional hydrogenation system, and which is capable of dissolving up to about 50 volume percent water therein such as methanol, ethanol, dioxane, tetrahydrofuran, and glacial acetic acid. It is preferred in this invention to use ethanol or dioxane as the solvent. The amount of solvent-water mixture to be used may vary within wide limits. It has been found that satisfactory results are obtained when the volume of solvent-water mixture used ranges between one and ten liters per 1.0 mol of 1-nitro-olefin, and preferably ranges between two and six liters per 1.0 mol of 1-nitro-olefin.

This invention will be further understood from the following examples which are illustrative only and should not be construed as limitative.

*Example I*

1-nitro-hexene-1 was prepared in accordance with the method set forth in "Mémoires Présentés à la Société Chimique," pages 133–139 (1940) by condensing n-valer-aldehyde with nitro-methane in the presence of triethyl amine. The condensation product was converted to the corresponding acetate using acetic anhydride and after refluxing in the presence of sodium carbonate and benzene for about 20 hours, the product was separated and recovered by distillation.

*Example II*

To 6.45 grams (0.05 mole) of 1-nitro-hexene-1 prepared in accordance with the method set forth in Example I, there was added 150 cc. of a 17 volume percent water-ethanol solvent mixture and 0.6 gram of a 10 percent palladium-on-charcoal catalyst. This mixture was hydrogenated in a Parr shaker apparatus at 45 to 60 p.s.i.g. of hydrogen at a temperature of 30° C. for about 1 hour.

The catalyst was separated from the reaction mixture by filtration, and the n-hexyl amine was recovered by distillation. That portion of material boiling at 56° C. at 55 mm. of mercury pressure was collected as the product. This material was identified by infra-red analysis and elemental analysis which showed a nitrogen content of 13.1 percent as compared with a theoretical nitrogen content of 13.86 percent. The yield of product was 56.4 percent.

*Example III*

To a mixture of 7.85 grams (0.05 mole) of 1-nitro-octene-1, prepared in accordance with the method set forth in Example I, and 150 cc. of a 17 percent water-ethanol solvent mixture, there was added 0.6 gram of 10 percent palladium on charcoal catalyst. This mixture was hydrogenated in a Parr shaker at 45 to 60 p.s.i.g. of hydrogen at a temperature of about 22° C. for about 1 hour.

The catalyst was separated from the reaction mixture by filtration and that portion of material boiling between 40 and 45° C. at 0.8 mm. of mercury pressure was collected as product. This material was identified as n-octyl amine by an infra-red analysis and the yield of product was 60.0 percent.

*Example IV*

To a mixture of 9.6 grams (0.956 mole) of 1-nitro-3,5,5-trimethyl-hexene-1 prepared in accordance with the method set forth in Example I and 150 cc. of a 17 percent water-ethanol solvent mixture, there was added 0.6 gram of 10 percent palladium on charcoal catalyst. This mixture was hydrogenated in a Parr shaker at 50 to 60 p.s.i.g. of hydrogen at a temperature of 22° C. for about 1 hour.

The catalyst was separated by filtration. Upon distillation of the reaction mixture, that portion boiling between 22 and 27° C. at 0.8 mm. of mercury pressure was collected as product. This material was identified by an infra-red analysis which showed a nitrogen content of 9.2 percent as compared with a theoretical nitrogen content of 9.7 percent. The yield of desired product was 54 percent.

*Example V*

To a mixture of 7.85 grams (0.05 mole) of 1-nitro-octene-1, prepared in accordance with the method set forth in Example I, and 150 cc. of a 17 percent water-dioxane solvent mixture, there was added 0.6 gram of 10 percent palladium on charcoal catalyst. This mixture was hydrogenated in a Parr shaker at 45 to 60 p.s.i.g. of hydrogen at a temperature of about 27° C. for about 1 hour.

The catalyst was separated from the reaction mixture by filtration and that portion of material boiling between 54 and 57° C. at 4.0 mm. of mercury pressure was collected as product. This material was identified as n-octyl amine by an infra-red analysis and the yield of product was 66.8 percent.

*Example VI*

Example III was repeated with the exception that no added water was present in the solvent. The resulting products included oximes, ketones, aldehydes, and polymeric compounds. The amount of n-octyl-amine was 3.6 percent.

It is apparent from the foregoing examples that saturated aliphatic primary amines may be prepared from nitro-olefins having the general formula $$R-CH=CH-NO_2$$

in substantial yields by a direct catalytic hydrogenation of the 1-nitro-olefin wherein the hydrogenation is conducted in the presence of a solvent mixture containing added water.

Obviously, many modifications and variations of the present invention herein described may be made without departing from the spirit and scope thereof and therefore only such limitations should be imposed as are indicated in the appended claims.

We claim:

1. A method for preparing a saturated aliphatic primary amine which comprises catalytically hydrogenating a 1-nitro-olefin having the general formula $$R-CH=CH-NO_2$$

wherein R is an alkyl radical containing from 1 to 24 carbon atoms in the presence of a solvent-water mixture selected from the group consisting of ethanol-water and dioxane-water wherein the water is present in said mixture in an amount ranging from 5 to 50 volume percent, said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

2. A method for preparing a saturated aliphatic primary amine which comprises catalytically hydrogenating a 1-nitro-olefin having the general formula $$R-CH=CH-NO_2$$

wherein R is an alkyl radical containing from 5 to 18 carbon atoms in the presence of a solvent-water mixture selected from the group consisting of ethanol-water and dioxane-water wherein the water is present in said mixture in an amount ranging from 10 to 30 volume percent, said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

3. A method for preparing a saturated aliphatic primary amine which comprises catalytically hydrogenating a 1-nitro-olefin having the general formula

R—CH=CH—NO$_2$ wherein R is an alkyl radical containing from 1 to 24 carbon atoms, in the presence of a palladium-on-charcoal catalyst and in the presence of an ethanol-water mixture, wherein the water is present in said mixture in an amount ranging from 5 to 50 volume percent said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

4. A method for preparing a saturated aliphatic primary amine which comprises catalytically hydrogenating a 1-nitro-olefin having the general formula

R—CH=CH—NO$_2$ wherein R is an alkyl radical containing from 1 to 24 carbon atoms, in the presence of a palladium-on-charcoal catalyst and in the presence of an ethanol-water mixture, wherein the water is present in said mixture in an amount ranging from 10 to 30 volume percent said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

5. A method for preparing n-hexyl amine which comprises catalytically hydrogenating 1-nitro-hexene-1 in the presence of a palladium-on-charcoal catalyst and in the presence of an ethanol-water mixture, wherein the water is present in said mixture in an amount ranging from 5 to 50 volume percent said hydrogenation being carried out at a temperature in the range of from 20° C. to 100° C. under a pressure in the range of from about 25 p.s.i.g. to about 80 p.s.i.g. of hydrogen and thereafter separating and recovering n-hexyl amine.

6. A method for preparing n-octyl amine which comprises catalytically hydrogenating 1-nitro-octene-1 in the presence of a palladium-on-charcoal catalyst and in the presence of an ethanol-water mixture, wherein the water is present in an amount ranging from 5 to 50 volume percent said hydrogenation being carried out at a temperature in the range of from 20° C. to 100° C. under a pressure in the range of from 25 p.s.i.g. to about 80 p.s.i.g. of hydrogen and thereafter separating and recovering n-octyl amine.

7. A method for preparing 3,5,5-trimethyl hexyl amine which comprises catalytically hydrogenating 1-nitro-3,5,5-trimethyl-hexene-1 in the presence of a palladium-on-charcoal catalyst and in the presence of an ethanol-water mixture, wherein the water is present in said mixture in an amount ranging from 5 to 50 volume percent said hydrogenation being carried out at a temperature in the range of from 20° C. to 100° C. under a pressure in the range of from about 25 p.s.i.g. to about 80 p.s.i.g. of hydrogen and thereafter separating and recovering 3,5,5-trimethyl hexyl amine.

8. A method for preparing a saturated aliphatic primary amine which comprises catalytically hydrogenating a 1-nitro-olefin having the general formula

R—CH=CH—NO$_2$ wherein R is an alkyl radical containing from 1 to 24 carbon atoms, in the presence of a palladium-on-charcoal catalyst and in the presence of a dioxane-water mixture, wherein the water is present in said mixture in an amount ranging from 5 to 50 volume percent said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

9. A method for preparing a saturated aliphatic primary amine which comprises catalytically hydrogenating a 1-nitro-olefin having the general formula

R—CH=CH—NO$_2$ wherein R is an alkyl radical containing from 1 to 24 carbon atoms in the presence of a palladium-on-charcoal catalyst and in the presence of a dioxane-water mixture, wherein the water is present in said mixture in an amount ranging from 10 to 30 volume percent said hydrogenation being carried out at a temperature in the range of from 20° C. to 100° C. under a pressure in the range of from about 25 p.s.i.g. to about 80 p.s.i.g. of hydrogen and thereafter separating and recovering the saturated aliphatic primary amine.

10. A method for preparing n-octyl amine which comprises catalytically hydrogenating 1-nitro-octene-1 in the presence of a palladium-on-charcoal catalyst and in the presence of a dioxane-water mixture, wherein the water is present in an amount ranging from 5 to 50 volume percent said hydrogenation being carried out at a temperature in the range of from 20° C. to 100° C. under a pressure in the range of from about 25 p.s.i.g. to about 80 p.s.i.g. of hydrogen and thereafter separating and recovering n-octyl amine.

References Cited by the Examiner
UNITED STATES PATENTS 2,174,498   9/1939   Johnson _____ 260—583

OTHER REFERENCES

Groggins Unit Processes in Organic Synthesis, McGraw-Hill, New York, Fifth Edition (1958), pp. 170 and 575.

CHARLES B. PARKER, *Primary Examiner.*